United States Patent [19]
Robinson

[11] Patent Number: 5,098,268
[45] Date of Patent: Mar. 24, 1992

[54] SEALING RINGS FOR USE WITH OUTER CURING ENVELOPE DURING TIRE RETREADING

[75] Inventor: Bruce R. Robinson, Chalfont, Pa.

[73] Assignee: Presti Rubber Products, Inc., New Britain, Pa.

[21] Appl. No.: 653,072

[22] Filed: Feb. 8, 1991

[51] Int. Cl.⁵ ............................................. B29C 35/02
[52] U.S. Cl. ................................. 425/14; 156/96; 425/28.1
[58] Field of Search ................. 156/96; 425/14, 28.1

[56] References Cited

U.S. PATENT DOCUMENTS

| | | | |
|---|---|---|---|
| 2,976,910 | 3/1961 | Nowak | 156/96 |
| 3,730,801 | 5/1973 | Martin | 156/96 |
| 3,868,284 | 2/1975 | Hogan, Sr. et al. | 156/96 |
| 3,966,535 | 6/1976 | Abularach | 156/394 |
| 4,036,271 | 7/1977 | Presti | 156/394 |
| 4,046,947 | 9/1977 | Brodie | 428/352 |
| 4,328,053 | 5/1982 | Medlin | 156/96 |
| 4,434,018 | 2/1984 | Brewer | 156/96 |
| 4,571,277 | 2/1986 | Goldstein | 156/96 |
| 4,792,379 | 12/1988 | Magee et al. | 156/909 |
| 4,869,759 | 9/1989 | King et al. | 156/96 |
| 5,007,978 | 4/1991 | Presti | 156/394.1 |

FOREIGN PATENT DOCUMENTS

| | | | |
|---|---|---|---|
| 0247469 | 12/1987 | European Pat. Off. | 425/14 |
| 92699 | 11/1959 | Netherlands | 156/96 |

OTHER PUBLICATIONS

Robbins Brochure entitled "The Accu-Seal II System" (Oct., 1990).

*Primary Examiner*—Willard E. Hoag
*Attorney, Agent, or Firm*—Howson and Howson

[57] ABSTRACT

Sealing rings for use with an outer curing envelope to retread a tire. Each ring includes an outwardly opening annular channel member having a base portion molded to conform to the contour of the tire bead, and an annular outer flange portion having an enlarged sealing rib for underlapping the outer curing envelope at the outer side of the tire casing near it maximum width. Two rings are required, one on each side of the tire casing, to form with the outer curing envelope a complete seal enclosure around the outside tire.

20 Claims, 2 Drawing Sheets

SEALING RINGS FOR USE WITH OUTER CURING ENVELOPE DURING TIRE RETREADING

BACKGROUND OF THE INVENTION

The present invention relates generally to tire retreading; and more particularly, it relates to novel and improved curing envelope sealing rings for use with an outer curing envelope to enclose a tire casing and tread strip assembly during retreading.

Tire retreading, or recapping, may be applied to any size tire casing, but is more commonly used on large radial truck tires. The casings of these tires usually have a longer useful life than their treads. Therefore, it is often more cost effective to retread a worn casing than to replace it with a new tire.

One known process simultaneously bonds and vulcanizes an uncured rubber on a worn tire casing in a tread forming mold. In another known process, a precured rubber strip with a premolded tread is wrapped around the buffed crown surface of the worn tire casing with a bonding agent such as uncured rubber or cushion gum disposed therebetween. The assembly is then sealingly enclosed in an annular elastomeric curing envelope of U-shaped radial cross-section, typically of thin synthetic rubber, or the like, such as manufactured by Presti Rubber Products, Inc. of New Britain, Pa. The annular space between the tread and the envelope is evacuated, thereby stretching the outer envelope into intimate contact with the outer sidewalls of the casing and all surfaces of the tread strip. This insures that uniform pressure is applied over the entire bonding area without tread distortion during the curing process. The outer envelope also prevents either air or steam from being entrapped between the tread strip and the casing and migrating into the bonding agent. The entire assembly is then placed in a curing chamber, or autoclave, at elevated temperatures and pressures to vulcanize the uncured components and to positively bond the casing and tread strip together. The outer envelope is then removed for reuse if desired.

Outer curing envelopes as described are not as easy to install as desired, especially when smaller inside diameter envelopes need to be pulled over the outside diameter of large truck tire casings. Therefore various special mountings, rims, and linings have been developed to facilitate sealing of the curing envelope around the tire casing and tread assembly.

In one known commercially available arrangement, the side skirts of the outer curing envelope are made longer than the sidewalls of the tire casing with which it is to be used. The excess margin of the outer envelope, i.e. the margins adjacent to the inner peripheries of the skirts, are tucked inside the tire beads and held in place by a radially-expandable ring. In this arrangement, the inside surface of the tire casing is exposed while the entire outside is encased.

Another arrangement involves the use with an outer envelope of an inner envelope of non-form fitting, pieced together construction for enclosing the entire inside surface and beads of the casing. This inner envelope includes annular flaps which are overlapped by the skirts of the outer curing envelope on both sides of the tire casing. The entire tire casing is thereby sheathed.

An improvement in the inner envelope arrangement described above is disclosed in co-pending U.S. patent application Ser. No. 07/336,758 filed on Apr. 12, 1989, by Frederick J. Presti, now U.S. Pat. No. 5,007,978, owned by the assignee of the present application. In this improvement, the inner envelope is of tripartite construction having a U-shaped portion which engages the inside of the tire casing and a pair of molded form-fit assemblies carried on the skirts of the U-shaped portion. The molded form-fit assemblies are each constructed so that the base and flaps conform to the surface contour of the beads of the casing. The flaps extend radially outward and along the outer sidewalls of the tire casing and terminate in enlarged annular ribs which sealingly underlap the skirts of the outer envelope on both sides of the casing. While very useful for the purposes intended, this improved inner envelope must be provided in numerous sizes and shapes to satisfy the large variety of sizes and shapes of tire casings. For reasons to be stated, there is a need for a retreading system which obtains the advantages associated with the use of an outer envelope but for a wider range of tire sizes.

SUMMARY OF THE INVENTION

Accordingly, it is an object of the present invention to provide a novel sealing ring suitable for use with an outer curing envelope in retreading tire casings of various sizes and configurations.

Another object is to provide sealing rings which can be readily mounted on, and demounted from, the tire beads while forming a positive seal with the inner sides of an outer curing envelope.

A still further object is to provide a unitary rim and sealing ring assembly suitable for use with an outer curing envelope in a tire retreading process.

Yet another object is to provide a reusable sealing ring which is particularly useful in tire bead restoration during the retreading process.

Briefly, these and other objects and advantages of the invention are accomplished with sealing rings of a molded vulcanized heat-resistant rubber installed between retreading rims and the beads of a tire casing, for cooperating with an outer curing envelope mounted about a tread strip and casing assembly to form an airtight outer enclosure therefor. Each sealing ring comprises an outwardly opening annular channel, molded to conform to the contour of the bead of a new tire, with a short inner flange and an annular outer flange having an enlarged integral outer peripheral sealing rib for underlapping the outer curing envelope at one outer side of the tire casing near its maximum width. Two rings are required, one on each side, to form a complete sealed enclosure around the outside of the tire casing, the inside of which is exposed. In an alternate embodiment, the sealing rings are bonded to the rims to form a unitary assembly which can be mounted readily.

Other objects, features and advantages of the invention will become more apparent from the following detailed description of the invention when considered in conjunction with the accompanying drawings.

DESCRIPTION OF THE PREFERRED EMBODIMENTS

Figure 1:
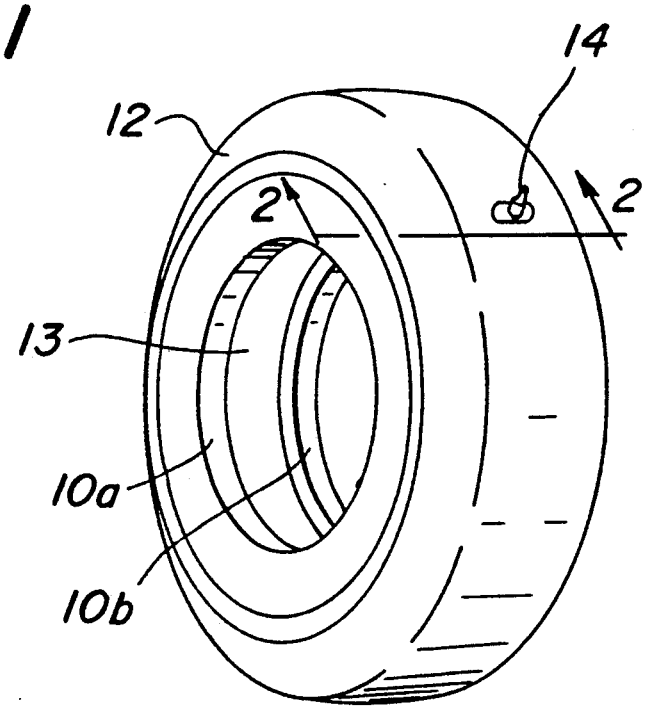
FIG. 1 is a perspective view of one embodiment illustrating sealing rings according to the invention installed with an outer curing envelope on a tire casing and tread strip assembly.

Referring now to the drawings wherein like characters designate like or corresponding parts throughout the several views, FIG. 1 shows a pair of reusable curing envelope sealing rings 10a and 10b, installed with an annular outer curing envelope 12 on a tire casing and tread assembly 13 prepared for retreading. The rings are identical in all respects except for being mounted on opposite sides of the casing. A valve 14 in outer envelope 12 provides a connection for drawing a vacuum in the space between the outer envelope and the tire casing thus forming a seal between the sealing rings 10a and 10b and the outer envelope.

Figure 2:
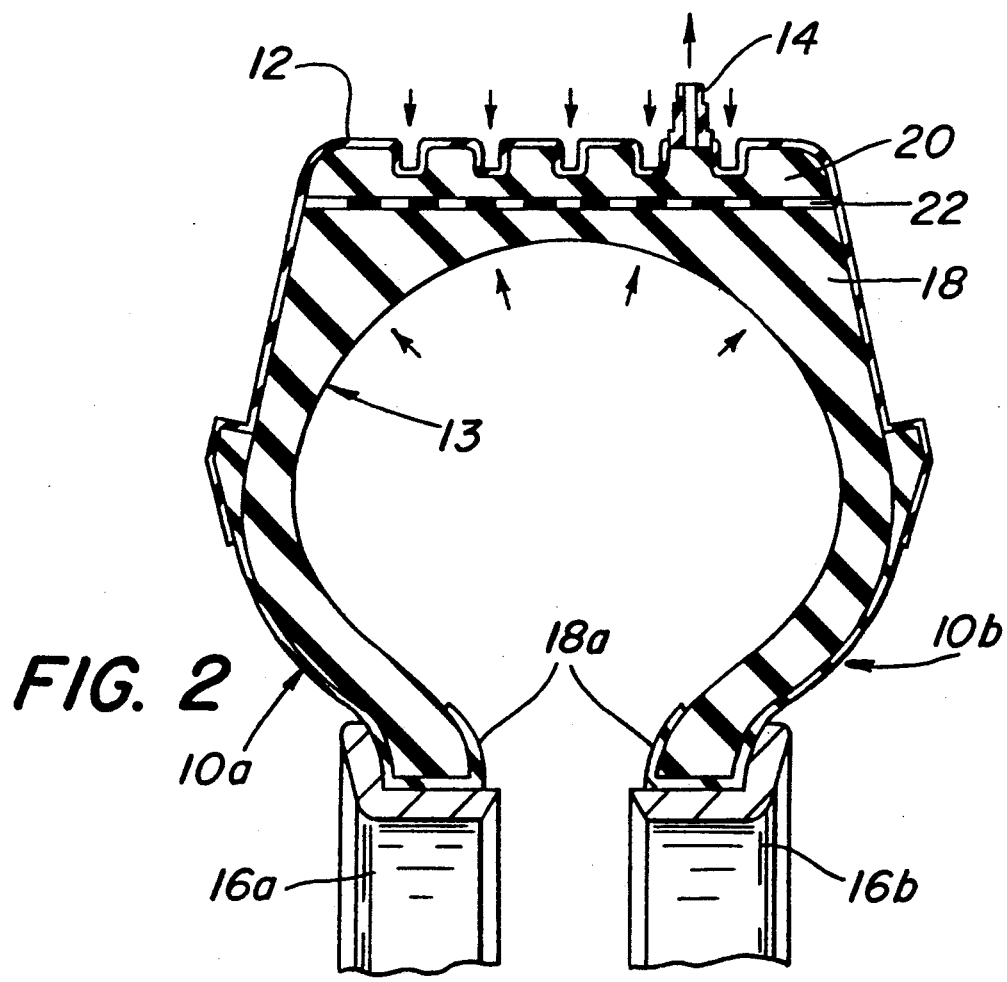
FIG. 2 is a view in radial cross section taken along the line 2—2 of FIG. 1 of the sealing rings and outer curing envelope showing the tire casing mounted on tire retreading rims and under external pressure.

FIG. 2 illustrates tire assembly 13 which includes a worn casing 18 with a precured tread strip 20 adhered to the crown of the casing by a layer of a bonding agent 22 such as precured cushion gum or rubber. Sealing rings 10a and 10b and outer envelope 12 are mounted on opposed sealing rims 16a and 16b, evacuated of air, and ready for placing in a curing chamber under controlled temperature and pressure. The rings and outer curing envelope are shown in a stressed state due to their being drawn by vacuum against the surface contours of the treads and sides of the casing.

Figure 3:
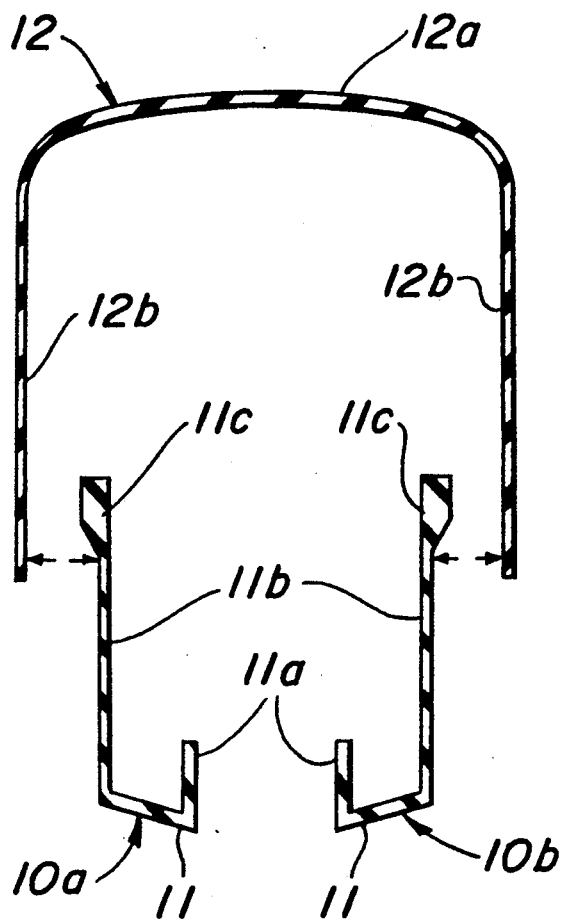
FIG. 3 is a view in radial cross section of the sealing rings and outer curing envelopes of FIG. 1 in an unstressed state.

Referring now to FIG. 3, outer curing envelope 12 is preferably of heat-resistant, synthetic rubber, compression-molded construction and is of generally U-shaped radial cross-section having a crown 12a and a pair of radially inwardly extending skirts 12b for contiguously covering tread strip 20 and radially inward portions of the sidewalls of casing 18. Crown 12a is preferably thicker than skirts 12b to allow it to be stretched with ease over the contour of the tire treads while minimizing any distortion of the tread when pressure is applied during vulcanizing. It is to be noted that the skirts 12b extend radially inward beyond the widest dimension of the tire casing, but need not extend as far as the tire casing beads. A preferred outer envelope is manufactured in accordance with the teachings of U.S. Pat. No. 4,036,271 which issued to Frederick J. Presti, the disclosure of which is incorporated by reference herein.

Curing envelope sealing rings 10a and 10b are identical to each other but are reversely installed on opposite rim-engaging shoulders, or beads, 18a of the tire casing. Each sealing ring 10a and 10b is also preferably, but not necessarily, of a monolithic compression-molded, heat-resistant rubber, such as disclosed in the above referenced '271 Presti patent. Each ring has a generally U-shaped radial cross-section defined by a base 11 of uniform thickness for engaging the inner periphery of bead 18a, a relatively narrow inner annular flange 11a for engaging an area on the inside of casing 18 adjacent the bead 18a, and a considerably wider outer annular flange 11b engaging an area on the outside of casing 18 and underlapping outer envelope skirt 12b. A complete enclosure around the outer surface of the tire is provided thereby, but the inside of the tire casing is uncovered except for a relatively small region adjacent the beads 18a.

The end of each outer flange 11b terminates in an enlarged integral annular sealing rib 11c of outwardly tapering generally wedge-shaped radial cross-section which terminates in an annular sealing shoulder 11d at its widest dimension. The sealing shoulder 11d extends outwardly from the casing sidewall for sealing engagement with the outer curing envelope where it underlaps its skirt 12b, preferably at the widest dimension of the tire casing, or in close proximity thereto. The inner annular flange 11a terminates short of the widest dimension of the tire and defines with the wider flange a U-shaped cross-section having legs of significantly unequal length. In the embodiment illustrated, the inner flange 11a has a length which corresponds substantially to the width of the tire bead 18a.

Sealing rings 10a and 10b in the vicinity of tire beads 18a are relatively thick in order to maintain, in molded relief, the original contour of the bead of a new tire when outer curing envelope 12 is drawn under vacuum. Specifically, the base 11 in the region adjacent the bead 18a is thicker than the outer flange 11b in the region radially inward of the sealing rib 11c. Thus, uncured rubber can be built up on the beads to restore it to the original contour during the retreading process.

Referring again to FIG. 2, the sealing rings 10a and 10b are installed in underlapping relation with the outer envelope 12 on a reconstructed tire assembly, and retreading rims 16a and 16b are then mounted within the inner periphery of sealing rings 10a and 10b to compress bases 11 against beads 18a and form a seal therewith. A vacuum is then drawn at valve 14 for causing ambient atmospheric pressure to draw the outer envelope into intimate contact with the entire tread surface and with the outer sides of the tire casing 18. In doing so, a positive seal is established along the shoulder 11d where the sealing ribs 11c of the sealing rings 10a and 10b underlap the skirts of outer envelope 12 at the widest dimension of the tire casing.

Figure 4:
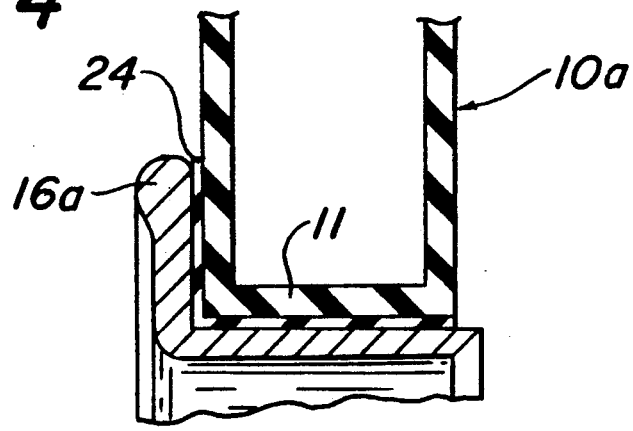
FIG. 4 is a view in radial cross section of a portion of another embodiment of a curing envelope sealing ring bonded to a tire retreading rim.

In an alternate embodiment, shown in the fragmentary cross-section of FIG. 4, curing envelope sealing rings 10a and 10b in the vicinity of their bases 11 are bonded to rigid annular rims 16a and 16b as by a vulcanized bonding agent 24, to form a unitary structure for quick mounting.

By way of example, and not by way of limitation, a preferred ring 10a for use in retreading an 11R 22.5, U.S. made truck tire, has an outer annular flange 11b length of 6.5 inches, an inner annular flange 11a length of 1.5 inches, and a base 11 length of 1.75 inches. The thickness of the ring in the region of the base is preferably about 0.130 inches. The thickness of the outer flange 11b in its necked-down region radially inward of the terminal end 11c is about 0.090–0.100 inches. The terminal end 11c has a radial extent of 2.0 inches and a shoulder length 11d, or thickness, of 0.5 inches adjacent its outermost end. The ring 10a is preferably fabricated of heat resistant rubber.

Some of the many advantages of the invention should now be readily apparent. For example, a reusable curing envelope sealing ring is provided which can be used in pairs for various widths of casings, thereby minimizing the assortment of components required for retreading. The rings can be quickly and easily installed to underlap an outer curing envelope and seal a tread strip and casing assembly for evacuating air or steam therefrom. The ring can also be made into a unitary assembly with a retreading rim.

While the present invention may not provide all the advantages associated with the use of the inside envelope which is the subject of co-pending application Ser. No. 07/336,758, supra, such as providing a complete barrier around the entire tire during vulcanization of the tread, its aforementioned advantages are nevertheless commercially significant to the small volume retreader who cannot afford to maintain the large inventory of inner envelopes required to handle a wide range of tire casing sizes.

Of course, it is understood that many changes in construction and widely differing embodiments and applications of the invention will be apparent to those skilled in the art to which this invention relates without departing from its spirit and scope as expressed in the appended claims.

What is claimed is:

1. For use with an annular outer elastomeric curing envelope to retread a tire having a crown and opposed sidewalls terminating in a pair of inner peripheral beads, the outer envelope having an inwardly opening U-shaped radial cross section for enclosing a tread strip secured around the crown of the tire casing and having skirts extending alongside annular portions of the outer side walls of the tire casing, a sealing ring comprising:
an annular molded elastomeric channel member having a base portion and inner and outer flange portions of unequal radial lengths shaped to enclose the tire bead and adjacent inner and outer sidewall portions of the tire casing, said outer flange portion including an annular sealing rib with a thickened rim for underlying engagement with a skirt of the outer curing envelope at the outer sidewall of the tire casing,
whereby use of a pair of sealing rings enables a sealed outer enclosure to be provided for the tire casing.

2. A sealing ring according to claim 1 wherein said radial cross section of said channel member is U-shaped and said inner flange portion is engageable with the inner periphery of the tire casing adjacent the bead.

3. A sealing ring according to claim 1 wherein said inner flange portion is shorter in radial length than said outer sidewall portion, and said outer flange portion terminates adjacent to the widest dimension of the tire casing.

4. A seal ring according to claim 3 wherein said rib is integral with said outer flange portion of said member.

5. A sealing ring according to claim 4 wherein said base portion of said channel member is of thicker gauge than said outer flange portion inwardly adjacent said sealing rib for supporting a built-up filler in the region of the tire casing bead.

6. A sealing ring according to claim 1 wherein said channel member is of compression molded, monolithic construction.

7. A sealing ring according to claim 1 further comprising a retreading rim bonded to the inner periphery of said base portion of said channel member.

8. Apparatus for use with an outer curing envelope surrounding a tire casing having a tread strip assembly applied about the outer periphery of the casing, comprising:
a pair of molded elastomeric sealing rings formed to be mounted on opposed beads of the tire casing, each of said sealing rings including an annular base portion shaped to enclose a respective one of the beads and an outer annular flange having a portion of greater thickness than other portions of said rings for extending radially outward therefrom for underlying sealing engagement with the curing envelope along respective outer sides of the tire casing, each of said rings having an inner flange engageable with the inner side of the tire casing for a radial distance which is less than the radial distance of engagement of the outer flange with the outer tire casing sidewall,
whereby the outer periphery of the tire casing can be completely encased from bead to bead to enable a vacuum to be drawn thereat.

9. Apparatus according to claim 8 wherein each of said sealing rings has a U-shaped outwardly-opening cross-section embracing its associated tire bead and defining an inner sidewall flange portion of shorter radial extent than said outer sidewall flange portion so that, when installed, the outside of the tire casing is covered and the inside is uncovered.

10. Apparatus according to claim 8 wherein said thicker portion of said outer annular flange portion terminates in an enlarged integral annular sealing rib located adjacent to the widest dimension of the tire casing.

11. Apparatus according to claim 8 wherein said base portion is of thicker gauge in the region of said the bead than the outer annular flange portion is in the immediately adjacent region.

12. Apparatus according to claim 8 including a rigid annular retreading rim secured to said sealing ring member around the inner periphery of its base portion.

13. Apparatus according to claim 8 wherein said sealing ring member has an inner flange portion extending parallel to said outer flange portion for less than its radial extent to define a U-shaped cross section having unequal leg lengths, said thicker portion of said outer flange portion has an annular sealing rib adjacent its peripheral terminus, said sealing rib tapering outwardly to form a wedge-shaped cross-section with the base of the wedge defining the periphery of the rib and being located at substantially the widest dimension of the tire casing.

14. Apparatus according to claim 8 wherein said thicker portion of said outer annular flange portion has an integral annular sealing shoulder on its outer surface for engaging in sealing relation the inside of the outer curing envelope skirt which is in overlapping relation therewith.

15. Apparatus for retreading a tire casing having a crown and a pair of sidewalls terminating in beads, wherein a tread is applied about the crown and vulcanized, and wherein the inside of the tire casing is exposed during vulcanization, said system comprising:
an outer elastomeric envelope having a crown portion adapted to engage the tread and having a pair of integral skirts extending radially inward from the crown portion, said skirts extending radially inward beyond the widest portion of the tire sidewall but terminating short of the tire beads; and
a pair of sealing ring members releasably engageable with the tire casing adjacent to its beads, each of said sealing ring members having a base portion for engaging the inner periphery of its associated tire casing bead and an outer annular flange extending radially outward therefrom along the outside of the tire casing sidewall, said outer flange carrying on its outside adjacent to the widest portion of the tire sidewall an annular sealing rib which is of greater thickness than other portions of said members and which is releasably engageable with the inside of the outer envelope skirt to form an air tight seal when a vacuum is drawn between the tire casing and the outer envelope, each of said sealing ring members having an inner flange engageable with the inner side of the tire casing for a radial distance which is less than the radial distance of engagement of the outer flange with the outer sidewall casing, whereby the entire outer surface of the tire casing is encased during vulcanization while the inner surface of the tire casing is exposed.

16. Apparatus according to claim 15 wherein each of said sealing ring members has a radially outwardly opening U-shaped cross-section with an inner annular flange shorter than said outer annular flange to form said cross-section with free legs of unequal length.

17. Apparatus according to claim 15 wherein said sealing rib is integral with said outer flange and forms a shoulder against which the outer envelope skirt is engaged when a sealing vacuum is drawn.

18. Apparatus according to claim 15 wherein the skirt portions of the outer envelope are unrestrained in the region radially inward of the zone of the seal.

19. Apparatus according to claim 15 wherein said base portion of each sealing ring member is bead-fitting and thickened in the region of the tire casing bead which it engages for enabling gouges in the bead to be filled during the vulcanizing process.

20. For use in a tire retreading system wherein a tread is disposed about the outer periphery of a tire casing having sidewalls terminating in beads, and wherein an outer elastomeric curing envelope having a pair of skirts is positioned around the tread and tire casing with its skirts extending radially inward alongside the sidewalls of the casing beyond the widest dimension thereof but less than their entire extent, a sealing ring member for use with a companion sealing ring member of like construction to form an air-tight sheath around the outside of the tire casing while leaving the inside of the tire casing exposed, said sealing ring member comprising a molded annular member of elastomeric material having a U-shaped cross-section with a base portion adapted to engage and extend across the inner periphery of the casing bead, an inner flange extending radially outward from said base portion, and an outer flange extending radially outward from said base portion in spaced parallel relation with said inner flange, said outer flange extending to at least the widest dimensions of the tire casing and said inner flange being shorter than said outer flange to form said cross-section with legs of unequal length, said outer flange terminating in an enlarged integral annular sealing rib shoulder which sealingly releasably engages the inside of the outer casing skirt adjacent to said widest tire casing dimension when a vacuum is drawn.

* * * * *

UNITED STATES PATENT AND TRADEMARK OFFICE
CERTIFICATE OF CORRECTION

PATENT NO. : 5,098,268

DATED : March 24, 1992

INVENTOR(S) : Bruce R. Robinson

It is certified that error appears in the above-identified patent and that said Letters Patent is hereby corrected as shown below:

At Column 5, line 41 "claim 1" should read --claim 2--.

Signed and Sealed this

First Day of June, 1993

Attest:

MICHAEL K. KIRK

Attesting Officer

Acting Commissioner of Patents and Trademarks